United States Patent [19]

Reid

[11] Patent Number: 4,710,663
[45] Date of Patent: Dec. 1, 1987

[54] DYNAMOELECTRIC MACHINE COIL SLOT WEDGE MOUNTING ARRANGEMENT

[75] Inventor: Stephen R. Reid, Winter Springs, Fla.

[73] Assignee: Westinghouse Electric Corp., Pittsburgh, Pa.

[21] Appl. No.: 941,250

[22] Filed: Dec. 12, 1986

[51] Int. Cl.$^4$ ............................................. H02K 3/48
[52] U.S. Cl. ..................................... 310/214; 310/215
[58] Field of Search ................. 310/214, 215, 261, 43, 310/44, 194, 195; 336/196, 197, 198

[56] References Cited

U.S. PATENT DOCUMENTS

| | | | |
|---|---|---|---|
| 678,864 | 7/1901 | Dempster | 310/214 UX |
| 790,471 | 5/1905 | Wright | 310/214 |
| 917,138 | 4/1909 | Robinson | 310/44 |
| 1,741,262 | 12/1929 | Wait | 310/214 UX |
| 2,446,708 | 8/1948 | Levin | 310/214 UX |
| 3,229,131 | 1/1966 | Lipe | 310/90 |
| 3,393,335 | 7/1968 | Pletenik | 310/214 |
| 3,408,516 | 10/1968 | Kudlacik | 310/195 |
| 4,159,562 | 7/1979 | Liptak | 310/214 |
| 4,200,818 | 4/1980 | Ruffing | 310/214 |
| 4,572,980 | 2/1986 | Anderson | 310/214 |

FOREIGN PATENT DOCUMENTS 0680841  9/1939  Fed. Rep. of Germany ...... 310/214

Primary Examiner—R. Skudy
Attorney, Agent, or Firm—K. Bach

[57] ABSTRACT

In a dynamoelectric machine rotor whose armature has circumferentially spaced teeth defining therebetween coil slots in which coils are disposed and which are closed by coil wedges provided with shoulders which engage armature tooth projections formed at the radially outer ends of the armature teeth to retain the slot wedges and the coils in the coil slots, the shoulders of the coil slots have self-lubricating material structures disposed thereon by which they are in engagement with armature tooth projections for the transmission of centrifugal forces generated by the coils and slot wedges to the armature teeth through the self-lubricating material structure thereby greatly reducing armature tooth peak stresses.

8 Claims, 3 Drawing Figures

DYNAMOELECTRIC MACHINE COIL SLOT WEDGE MOUNTING ARRANGEMENT

BACKGROUND OF THE INVENTION

The invention relates to dynamoelectric machines and more particularly to slot wedges used to close the coil slots of generator rotors.

The slot wedges are provided in the armature coil slots of rotors to close the rotor slots and retain therein the coils against the large centrifugal forces generated by the coils during operation of the generator. The centrifugal forces taken up by the slot wedges are transmitted by the slot wedges to the rotor teeth which are engaged by the slot wedges. To provide support for the slot wedges the teeth have at their radially outer ends opposite wall sections which project toward one another thereby forming inclined support wall structures for supporting the slot wedges as shown for example in U.S. Pat. Nos. 678,864, 1,741,262, 2,446,708. It has been found, however, that the centrifugal forces are not evenly transmitted from the slot wedges to the rotor teeth. A cross-sectional analysis of generator rotors to yield peak stresses indicated that the tooth tip stresses far exceeded the yield strength of the rotor material. As a result failure of rotor teeth may occur and in fact have occurred resulting in expensive shutdown of the power generator plant for repair.

It is therefore the principal object of the present invention to provide a rotor design with slot wedges which generate only relatively low rotor teeth stresses so as to avoid failure of the rotor teeth without a change in rotor design.

SUMMARY OF THE INVENTION

The peak stresses on the teeth of dynamoelectric machine rotors having coils disposed in rotor slots which are closed by slot wedges are minimized by mounting plates of a DU ® self-lubricating material on the wedge surfaces of the slot wedge such that the support surfaces of the rotor slots are engaged only by the DU ® plates through which all the centrifugal forces generated by the coil and coil wedges are transmitted.

Such an arrangement provides for greatly reduced friction between the slot wedge and the rotor teeth and as a result changes the magnitude of the forces which are applied to the rotor teeth. A finite-element analysis of the arrangement according to the invention shows a reduction of peak tooth stresses of up to 25%. Such peak stress reduction results in greatly reduced frequency if not elimination of generator rotor tooth failure and therefore in reduced downtime of a power plant for repairs.

BRIEF DESCRIPTION OF THE DRAWINGS

The invention will become more readily apparent from the following description of a preferred embodiment thereof shown, by way of example only, in the accompanying drawings wherein.

DESCRIPTION OF THE PREFERRED EMBODIMENT

Figure 1:
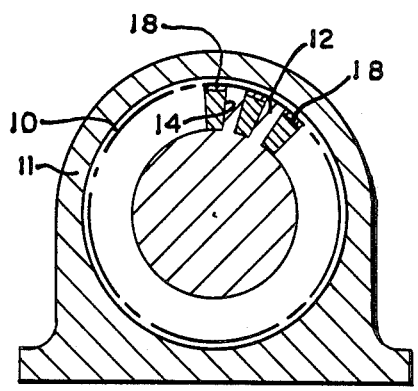
FIG. 1 is an axial view of a rotor of a generator of an electric motor.
Figure 2:
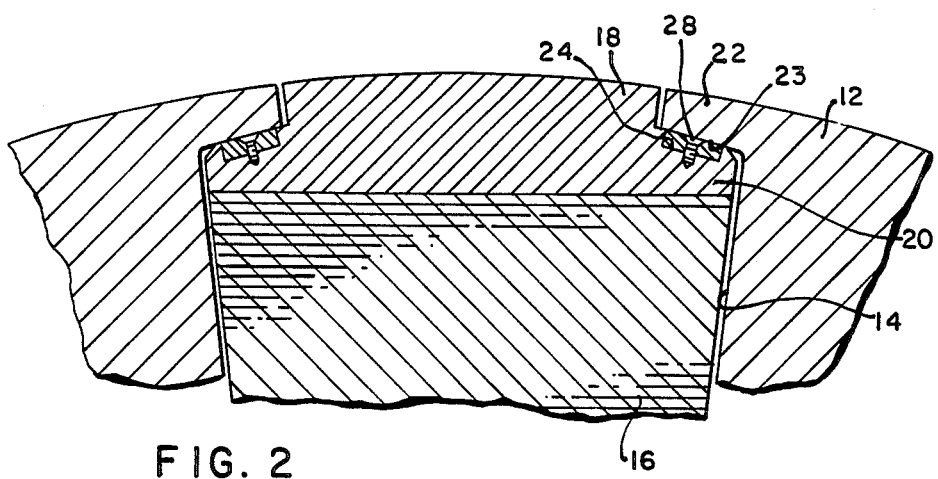
FIG. 2 is a sectional view of a portion of the rotor showing the interface area of a rotor slot wedge disposed in the coil slots of the rotor.
Figure 3:
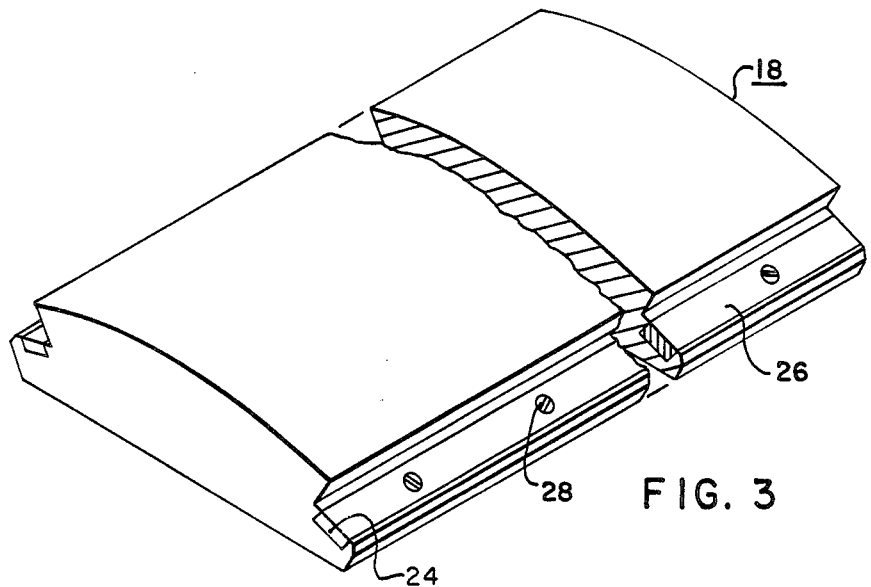
FIG. 3 is a perspective view of a slot wedge in accordance with the invention.

As shown in FIG. 1 a rotor 10 of a motor or generator which is rotatably supported in a stator housing 11 consists of an armature having circumferentially spaced tooth portions 12 defining therebetween coil slots 14 in which rotor coils 16 are disposed. The coil slots 14 are closed by slot wedges 18 which have shoulder portions 20 in engagement with tooth projections 22 provided with angled support surfaces 23 in order to retain the coils 16 in the coil slots 14. It is noted that, during operation of the rotor, the coils together with the slot wedges generate substantial centrifugal forces which have to be taken up by the tooth projections 22 and generate substantial stresses in the teeth 12.

The shoulders 20 of the slot wedges 18 have cavities 24 formed therein in which DU ® self-lubricating plates 26 are disposed and mounted for example by screws 28 in such a manner that the DU self-lubricating plate 26 is in contact with the tooth projections 22 of the rotor 10. The DU self-lubricating plates are commercially available from Garloc Bearings Inc., 700 Mid Atlantic Parkway, Thorofare, NJ 08086. They are essentially steel plates provided with a bronze layer impregnated with Teflon and lead.

The invention is not limited to the arrangement as described herein. The DU self-lubricating plate may be retained on the shoulders 20 of the slot wedges 18 for example by tack welding or they may simply be disposed in cavities 24.

With this arrangement friction between the slot wedge 18 and the rotor tooth projections is essentially eliminated so that minute movement of the slot wedge relative to the tooth projections under the heavy centrifugal force applied thereto during generation of the rotor can be accommodated. Such freedom of movement permits an advantageous change of the magnitude of the forces applied to the tooth projections with the result that the tooth stresses are greatly reduced. Finite-element analysis of the structure and forces indicates a 25% reduction in tooth stresses!

What is claimed is:

1. A dynamoelectric machine rotor comprising an armature having circumferentially spaced rotor teeth with coil slots formed between adjacent teeth and coils disposed in said coil slots, said teeth having projections formed at their radially outer ends and projecting toward one another into the adjacent coil slots, and coil wedges disposed in said coil slots between adjacent teeth, and having shoulder portions engaging said tooth projections to be supported thereby, said coil wedges having a self-lubricating material structure disposed on their shoulder portions in engagement with said tooth projections.

2. A rotor according to claim 1, wherein the shoulder portions of said coil wedges have cavities formed therein and a plate having a surface of self-lubricating material is disposed in each of said cavities.

3. A rotor according to claim 1, wherein said self-lubricating material structure is a DU ® self-lubricating plate.

4. A rotor according to claim 1, wherein said self-lubricating material structure is a plate mounted on said shoulders by a series of mounting screws.

5. A dynamoelectric machine comprising: a stator housing, a rotor rotatably supported in said housing and including an armature having circumferentially spaced rotor teeth with coil slots formed between adjacent teeth and coils disposed in said coil slots, said teeth having projections formed at their radially outer ends and projecting toward one another into the adjacent coil slots, and coil wedges disposed in said coil slots between adjacent teeth, and having shoulder portions engaging said tooth projections to be supported thereby, said coil wedges having a self-lubricating material structure disposed on their shoulder portions in engagement with said tooth projections.

6. A dynamoelectric machine according to claim 5, wherein the shoulder portions of said coil wedges have cavities formed therein and a plate having a surface of self-lubricating material is disposed in each of said cavities.

7. A dynamoelectric machine according to claim 5, wherein said self-lubricating material structure is a DU ® self-lubricating plate.

8. A dynamoelectric machine according to claim 5, wherein said self-lubricating material structure is a plate mounted on said shoulders by a series of mounting screws.

* * * * *

Dedication 4,710,663.—*Stephen R. Reid*, Winter Springs, Fla. DYNAMOELECTRIC MACHINE COIL SLOT WEDGE MOUNTING ARRANGEMENT. Patent dated Dec. 1, 1987. Dedication filed Feb. 3, 1989, by the assignee, *Westinghouse Electric Corp.*

Hereby dedicates to the Public the remaining term of said patent.

[*Official Gazette April 18, 1989.*]